US011907661B2

(12) United States Patent
Tong et al.

(10) Patent No.: US 11,907,661 B2
(45) Date of Patent: Feb. 20, 2024

(54) METHOD AND APPARATUS FOR SEQUENCE LABELING ON ENTITY TEXT, AND NON-TRANSITORY COMPUTER-READABLE RECORDING MEDIUM

(71) Applicants: Yixuan Tong, Beijing (CN); Yongwei Zhang, Beijing (CN); Bin Dong, Beijing (CN); Shanshan Jiang, Beijing (CN); Jiashi Zhang, Beijing (CN)

(72) Inventors: Yixuan Tong, Beijing (CN); Yongwei Zhang, Beijing (CN); Bin Dong, Beijing (CN); Shanshan Jiang, Beijing (CN); Jiashi Zhang, Beijing (CN)

(73) Assignee: Ricoh Company, Ltd., Tokyo (JP)

( * ) Notice: Subject to any disclaimer, the term of this patent is extended or adjusted under 35 U.S.C. 154(b) by 313 days.

(21) Appl. No.: 17/455,967

(22) Filed: Nov. 22, 2021

(65) Prior Publication Data
US 2022/0164536 A1    May 26, 2022

(30) Foreign Application Priority Data

Nov. 25, 2020    (CN) .......................... 202011340269.6

(51) Int. Cl.
*G06F 40/279*        (2020.01)
*G06F 40/295*        (2020.01)

(52) U.S. Cl.
CPC .................................. *G06F 40/295* (2020.01)

(58) Field of Classification Search
None
See application file for complete search history.

(56) References Cited

U.S. PATENT DOCUMENTS

| | | | |
|---|---|---|---|
| 11,551,042 B1 * | 1/2023 | Yu ........................... | G06N 20/20 |
| 2016/0147891 A1 * | 5/2016 | Chhichhia ............. | G06F 16/986 |
| | | | 707/734 |
| 2018/0203843 A1 * | 7/2018 | Mehdad ................ | G06F 40/295 |
| 2018/0341863 A1 | 11/2018 | Ding et al. | |
| 2019/0065460 A1 * | 2/2019 | Xin ........................ | G06N 3/044 |
| 2019/0251164 A1 | 8/2019 | Ding et al. | |
| 2020/0250139 A1 * | 8/2020 | Muffat ............... | G06V 30/1988 |
| 2021/0216715 A1 * | 7/2021 | Wang .................... | G06F 40/279 |
| 2021/0216880 A1 * | 7/2021 | Jin .......................... | G06F 16/36 |
| 2021/0365635 A1 * | 11/2021 | Olabiyi ................... | G06F 40/30 |
| 2022/0012633 A1 * | 1/2022 | Molahalli ........... | G06F 18/2155 |

* cited by examiner

*Primary Examiner* — Jakieda R Jackson
(74) *Attorney, Agent, or Firm* — IPUSA, PLLC

(57) ABSTRACT

A method and an apparatus for sequence labeling on an entity text, and a non-transitory computer-readable recording medium are provided. In the method, a start position of an entity text within a target text is determined. Then, a first matrix is generated based on the start position of the entity text. Elements in the first matrix indicates focusable weights of each word with respect to other words in the target text. Then, a named entity recognition model is generated using the first matrix. The named entity recognition model is obtained by training using first training data, the first training data includes word embeddings corresponding to respective texts in a training text set, and the texts are texts whose entity label has been labeled. Then, the target text is input to the named entity recognition model, and probability distribution of the entity label is output.

15 Claims, 7 Drawing Sheets

FIG.3

| ORIGINAL SENTENCE | SHI RYO WA TO YAMA KEN FU GAN UN GA NO TEI SHITSU O MOCHI I TA |  |  |  |  |  |  |  |  |  |
|---|---|---|---|---|---|---|---|---|---|---|
| WORD SEGMENTATION RESULT | SHIRYO/WA/TOYAMA/KEN/FUGAN/UNGA/NO/TEISHITSU/O/MOCHII/TA |  |  |  |  |  |  |  |  |  |
| WORD-SEGMENT SEGMENTATION RESULT | SHIRYO | WA | TOYAMA | KEN | FU@@ GAN UN@@ | GA | NO | TEISHITSU | O | MOCHII | TA |

FIG.4

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

FIG.5

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 1 | 0 | 0 | 0 | 0 |
| 0 | 0 | 0 | 1 | 1 | 0 | 0 | 0 |
| 0 | 0 | 0 | 1 | 1 | 1 | 0 | 0 |
| 0 | 0 | 0 | 1 | 1 | 1 | 1 | 0 |
| 0 | 0 | 0 | 0 | 0 | 0 | 0 | 0 |

METHOD AND APPARATUS FOR SEQUENCE LABELING ON ENTITY TEXT, AND NON-TRANSITORY COMPUTER-READABLE RECORDING MEDIUM

CROSS-REFERENCE TO RELATED APPLICATIONS

The present application claims priority under 35 U.S.C. § 119 to Chinese Application No. 202011340269.6 filed on Nov. 25, 2020, the entire contents of which are incorporated herein by reference.

BACKGROUND OF THE INVENTION

1. Field of the Invention

The present invention relates to the field of natural language processing (NLP), and specifically, a method and an apparatus for sequence labeling on an entity text, and a non-transitory computer-readable recording medium.

2. Description of the Related Art

In the conventional entity recognition task, a sequence labeling method based on the conditional random fields (CRF) model is the most commonly used method. In such a method, generally, one or more feature sequences are created based on the character sequence or word sequence of an input text. Then a series of feature templates that standardize features and feature combinations to be extracted in the one or more feature sequences are defined. Finally, the extracted feature sequences are input to a sequence label obtained in the CRF so as to contain boundary information and category information of the entity.

However, the accuracy of entity label recognition in related technologies are insufficient.

SUMMARY OF THE INVENTION

According to an aspect of the present invention, a method for sequence labeling on an entity text is provided. The method includes determining a start position of an entity text within a target text, the target text being a text having an entity label to be recognized; generating a first matrix based on the start position of the entity text within the target text, the number of rows and the number of columns of the first matrix being equal to a sequence length of the target text, elements in the first matrix indicating focusable weights of each word with respect to other words in the target text, the focusable weight of a word in the target text that is within the entity text with respect to a first word being greater than the focusable weight of the word with respect to a second word, the first word including the word, and one or more words between the start position of the entity text and the word, and the second word being a word other than the first word in the target text; generating a named entity recognition model using the first matrix, the named entity recognition model being obtained by training using first training data, the first training data including word embeddings corresponding to one or more respective texts in a training text set, and the texts in the training text set being texts whose entity label has been labeled; and inputting the target text to the named entity recognition model, and outputting probability distribution of the entity label corresponding to the target text.

According to another aspect of the present invention, an apparatus for sequence labeling on an entity text is provided. The apparatus includes a memory storing computer-executable instructions; and one or more processors. The one or more processors are configured to execute the computer-executable instructions such that the one or more processors are configured to determine a start position of an entity text within a target text, the target text being a text having an entity label to be recognized; generate a first matrix based on the start position of the entity text within the target text, the number of rows and the number of columns of the first matrix being equal to a sequence length of the target text, elements in the first matrix indicating focusable weights of each word with respect to other words in the target text, the focusable weight of a word in the target text that is within the entity text with respect to a first word being greater than the focusable weight of the word with respect to a second word, the first word including the word, and one or more words between the start position of the entity text and the word, and the second word being a word other than the first word in the target text; generate a named entity recognition model using the first matrix, the named entity recognition model being obtained by training using first training data, the first training data including word embeddings corresponding to one or more respective texts in a training text set, and the texts in the training text set being texts whose entity label has been labeled; and input the target text to the named entity recognition model, and output probability distribution of the entity label corresponding to the target text.

According to another aspect of the present invention, a non-transitory computer-readable recording medium having computer-executable instructions for execution by one or more processors is provided. The computer-executable instructions, when executed, cause the one or more processors to carry out a method for sequence labeling on an entity text. The method includes determining a start position of an entity text within a target text, the target text being a text having an entity label to be recognized; generating a first matrix based on the start position of the entity text within the target text, the number of rows and the number of columns of the first matrix being equal to a sequence length of the target text, elements in the first matrix indicating focusable weights of each word with respect to other words in the target text, the focusable weight of a word in the target text that is within the entity text with respect to a first word being greater than the focusable weight of the word with respect to a second word, the first word including the word, and one or more words between the start position of the entity text and the word, and the second word being a word other than the first word in the target text; generating a named entity recognition model using the first matrix, the named entity recognition model being obtained by training using first training data, the first training data including word embeddings corresponding to one or more respective texts in a training text set, and the texts in the training text set being texts whose entity label has been labeled; and inputting the target text to the named entity recognition model, and outputting probability distribution of the entity label corresponding to the target text.

BRIEF DESCRIPTION OF THE DRAWINGS

The above and other objects, features and advantages of the present invention will be further clarified the following detailed description of embodiments of the present invention in combination with the drawings.

FIG. 3 is a schematic diagram illustrating an example of word segmentation and word-segment segmentation according to the embodiment of the present invention.

FIG. 4 is a schematic diagram illustrating an example of an initial matrix according to the embodiment of the present invention.

FIG. 5 is a schematic diagram illustrating an example of a first matrix according to the embodiment of the present invention.

DESCRIPTION OF THE EMBODIMENTS

In the following, specific embodiments of the present invention will be described in detail with reference to the accompanying drawings, so as to facilitate the understanding of technical problems to be solved by the present invention, technical solutions of the present invention, and advantages of the present invention. The present invention is not limited to the specifically described embodiments, and various modifications, combinations and replacements may be made without departing from the scope of the present invention. In addition, descriptions of well-known functions and constructions are omitted for clarity and conciseness.

Note that "one embodiment" or "an embodiment" mentioned in the present specification means that specific features, structures or characteristics relating to the embodiment are included in at least one embodiment of the present invention. Thus, "one embodiment" or "an embodiment" mentioned in the present specification may not be the same embodiment. Additionally, these specific features, structures or characteristics may be combined in any suitable manner in one or more embodiments.

Note that steps of the methods may be performed in sequential order, however the order in which the steps are performed is not limited to a sequential order. Further, the described steps may be performed in parallel or independently.

In view of the problem of the conventional technology, an object of the embodiments of the present invention is to provide a method and an apparatus for sequence labeling on an entity text, and a non-transitory computer-readable recording medium that can accurately recognize an entity label of a text.

First Embodiment

Figure 1:
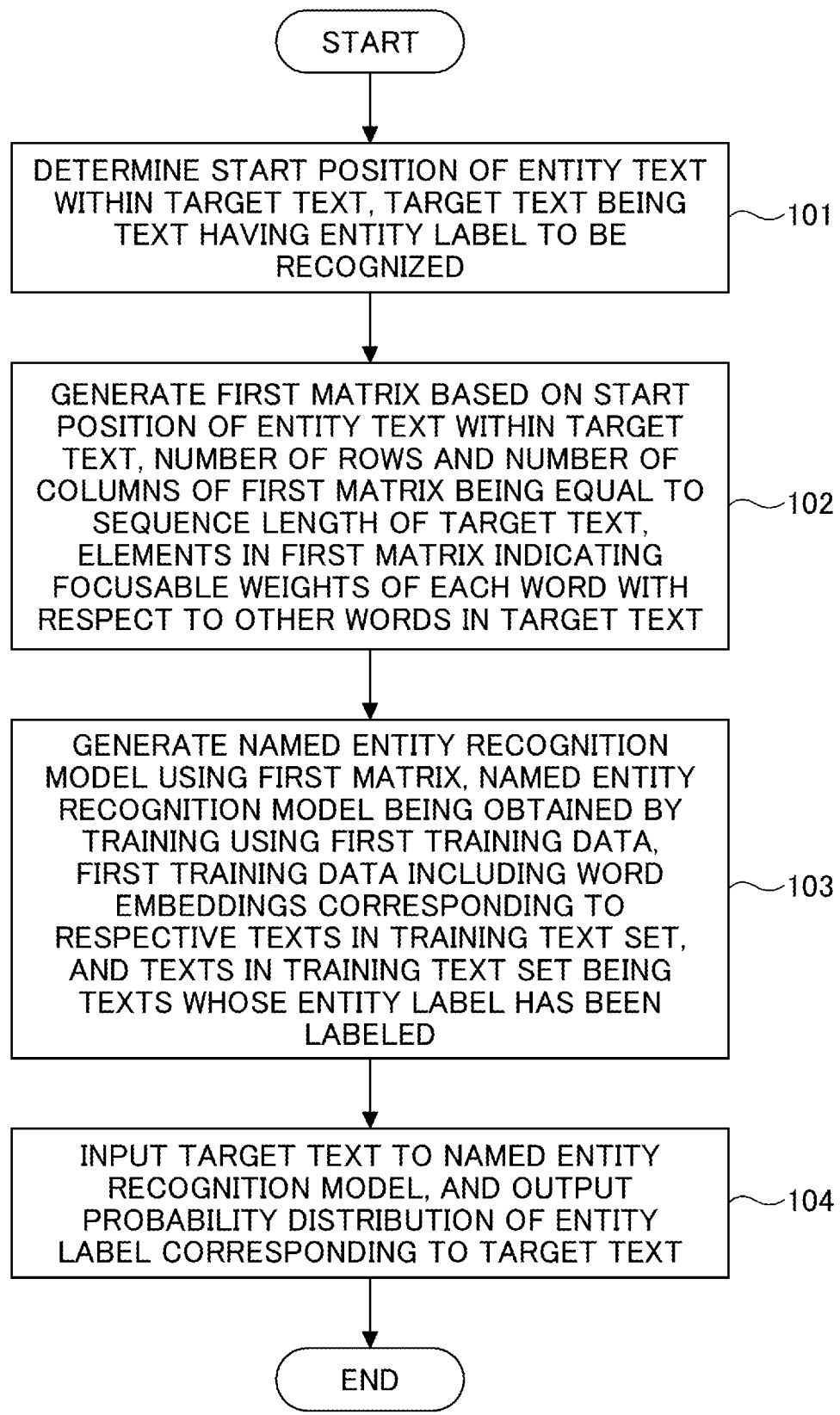
FIG. 1 is a flowchart illustrating a sequence labeling method for an entity text according to an embodiment of the present invention.

In an embodiment of the present invention, a sequence labeling method for an entity text is provided. FIG. 1 is a flowchart illustrating the sequence labeling method for the entity text according to an embodiment of the present invention. As shown in FIG. 1, the sequence labeling method for the entity text according to the embodiment of the present invention includes steps 101 to 104.

In step 101, a start position of an entity text within a target text is determined. The target text is a text having an entity label to be recognized.

Here, the target text may be a text input by a user, or a text obtained from the Internet. In a specific example, the target text may be "the potential to increase the hypotensive effect of".

Figure 2:
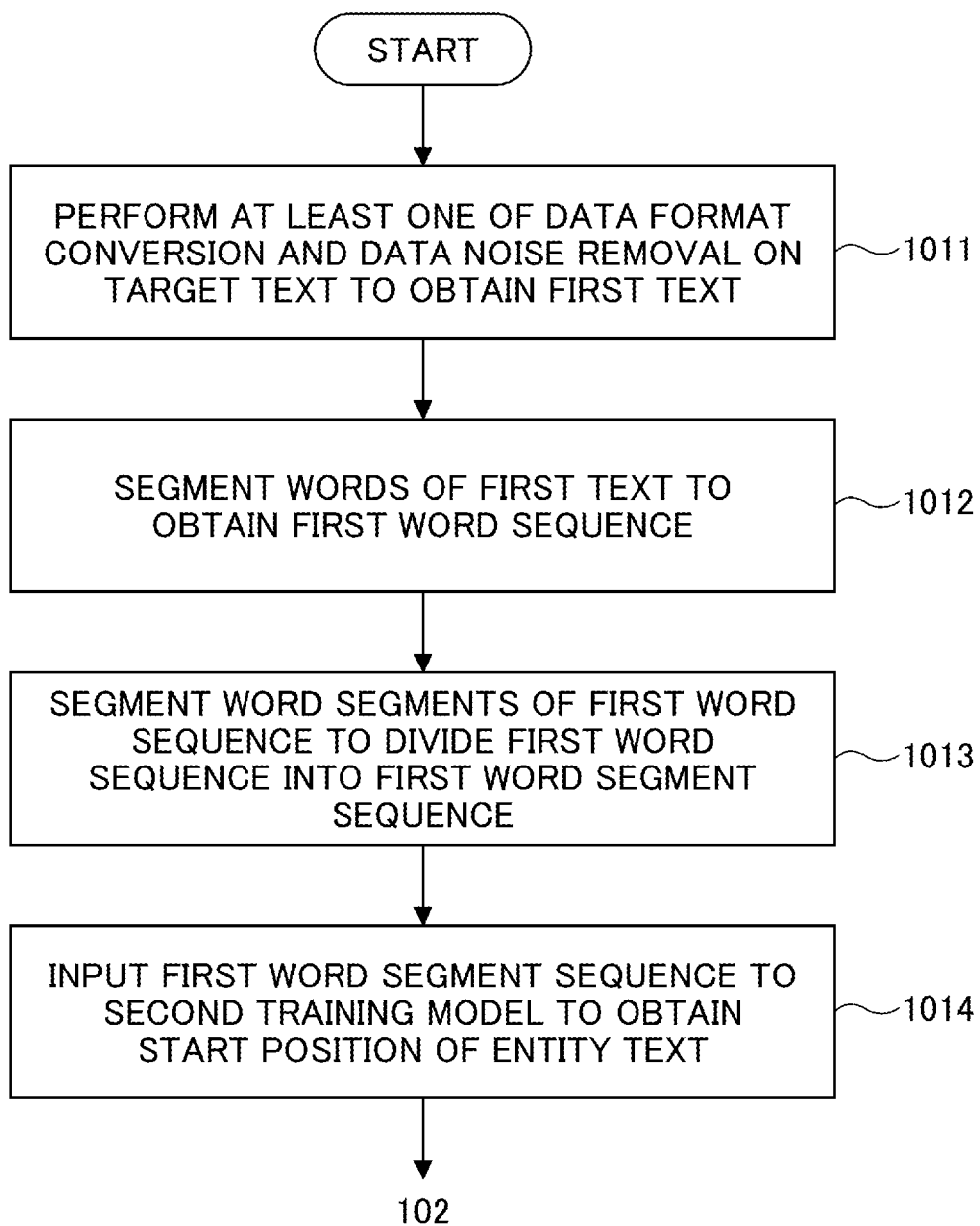
FIG. 2 is a flowchart illustrating a step of determining a start position of an entity text within a target text according to the embodiment of the present invention.

As shown in FIG. 2, step 101 may include steps 1011 to 1014.

In step 1011, at least one of data format conversion and data noise removal is performed on the target text to obtain a first text.

A data format of the target text may not meet the requirements. If the data format of the target text does not meet the requirements, the data format conversion of the target text may be performed to convert the original data format of the target text into a convenient format. Furthermore, the target text may include some data noise, such as a uniform resource locator (URL), an e-mail address, and a symbol such as "<" or ">"" introduced by a webpage. Such data noises may be removed, and xml tags such as "<html>", "<title>" and "<body>" introduced by a webpage may also be removed, so that only a text between the tags is kept to obtain the first text.

In step 1012, words of the first text are segmented to obtain a first word sequence.

After at least one of the data format conversion and the data noise removal on the target text are performed to obtain the first text, the words of the first text may be segmented to divide a sentence in the first text into processable information units.

In some examples, an input first text sequence may be divided into word sequences using a python library NLTK. Note that a tool for segmenting the first text sequence is not limited to the above tool, and another tool for segmenting words may also be used.

In step 1013, word segments of the first word sequence are segmented to divide the first word sequence into a first word segment sequence.

In some examples, a first segmentation model may be trained in advance, and the word segments of the first word sequence may be segmented using the first segmentation model to divide the first word sequence into the first word segment sequence.

The method further includes a step of obtaining the first segmentation model. The step of obtaining the first segmentation model includes the following steps. First, a first initial model is constructed. Then the first initial model is trained using second training data to obtain a first segmentation model. The second training data includes a plurality of sets of data, and each set of the data includes a word sequence and a word segment sequence obtained by segmenting the word sequence.

In some examples, the word sequence obtained in step 1012 may be divided into the word segment sequence based on an open source tool subword-nmt. When training the first segmentation model, the model is trained using texts in the second training data, and a hyperparameter "s" in the first segmentation model may be set to 15000. Furthermore, when segmenting the word sequence obtained in step 1012 using the trained first segmentation model, a hyperparameter "vocabulary-threshold" may be set to 50.

In a specific example, as shown in FIG. 3, the first text is the Japanese sentence "Shi Ryo Wa To Yama Ken Fu Gan Un Ga No Tei Shitsu O Mochi I Ta", the word sequence obtained by segmenting the first text is "ShiRyo/Wa/ToYama/Ken/FuGan/UnGa/No/TeiShitsu/O/Mochi I/Ta", and the word segment sequence obtained by segmenting the word segments of the word sequence is "ShiRyo", "Wa", "ToYama", "Ken", "FuGan", "UnGa", "No", "TeiShitsu", "O", MochiI" and "Ta".

In step 1014, the first word segment sequence is input to a second training model to obtain the start position of the entity text.

Here, the second training model is a pre-trained model for recognizing the start position of the entity text, which can predict the start position of the entity text based on the input word segment sequence.

The method further includes a step of obtaining the second training model. The step of obtaining the second training model includes the following steps.

First, a second initial model is constructed. Then, the second initial model is trained using third training data to obtain the second training model. The third training data includes a plurality of word segment sequences whose start position of entity text has been labeled. Here, the language of the target text is associated with the language of the training data.

In a specific example, the word segment sequence that is input to the second training model is "the potential to increase the hypotensive effect of", the entity text thereof is "increase the hypotensive effect", and the start position of the entity text obtained using the second training model is "increase".

In step 102, a first matrix is generated based on the start position of the entity text within the target text. The number of rows and the number of columns of the first matrix are equal to a sequence length of the target text. Elements in the first matrix indicate focusable weights of each word with respect to other words in the target text. The focusable weight of a word in the target text that is within the entity text with respect to a first word is greater than the focusable weight of the word with respect to a second word. The first word includes the word, and one or more words between the start position of the entity text and the word. The second word is a word other than the first word in the target text.

For each first word segment sequence, an initial matrix is generated. The number of rows and the number of columns of the initial matrix are equal to the length of the first word segment sequence, and values of all elements in the initial matrix are "0". For example, if the input sequence is "the potential to increase the hypotensive effect of", the initial matrix is shown in FIG. 4.

The values of the elements in the initial matrix are modified based on the start position of the entity text to obtain the first matrix. The elements in the first matrix indicate focusable weights whose value may be a non-zero value or zero. Here, the non-zero value may be "1" or may be set to another value as needed. If the value of the element is the non-zero value, it means that the corresponding position can be focused, and if the value of the element is zero, it means that the corresponding position cannot be focused. The value of the element in the i-th row of the first matrix indicates the focusable weight of the i-th word in an input sequence. The value of the element in the i-th row and the j-th column of the first matrix indicates the focusable weight of the i-th word with respect to the j-th word in the input sequence. Specifically, the values of the elements may be modified according to the following rules. For each word in the input sequence, if the word is within the scope of the entity text, the named entity recognition model may focus on the current word itself, and other words on the left of the current word within the scope of the entity text. The positions that cannot be focused retain the value of "0".

Specifically, the elements in the a-th row in the first matrix corresponds to the a-th word in the target text. If the a-th word and the k words on the left of the a-th word are within the scope of the entity text, values of the a-k-th element to the a-th element in the a-th row are set to the non-zero value, and values of other elements in the a-th row are set to zero, where a, i, j and k are positive integers.

In a specific example, the input sequence is "the potential to increase the hypotensive effect of", and the entity text thereof is "increase the hypotensive effect". Because the input sequence contains 8 words, the size of the first matrix is 8*8.

The element in the first row of the first matrix corresponds to the first word "the" of the input sequence. The values of the elements in the first row of the first matrix are all 0, because the first word "the" is not within the entity text.

The element in the second row of the first matrix corresponds to the second word "potential" of the input sequence. The values of the elements in the second row of the first matrix are all 0, because the second word "potential" is not within the entity text.

The element in the third row of the first matrix corresponds to the third word "to" of the input sequence. The values of the elements in the third row of the first matrix are all 0, because the third word "to" is not within the entity text.

The element in the fourth row of the first matrix corresponds to the fourth word "increase" of the input sequence, which is the first word of the entity text. Only the value of the fourth element in the fourth row of the first matrix is "1", and the values of other elements are 0", which means that the named entity recognition model can only focus on the information of "increase" itself, and there is no other word on the left of "increase" in the entity text.

The fifth row element of the first matrix corresponds to the fifth word "the" of the input sequence. The values of the fourth element and the fifth element in the fifth row of the first matrix are "1", which means that the named entity recognition model can focus on word "the" itself and "increase" on the left of "the", because "increase" on the left of "the" is also in the entity text.

The sixth row element of the first matrix corresponds to the sixth word "hypotensive" of the input sequence. The values of the fourth element, the fifth element and the sixth element in the sixth row of the first matrix are "1", which means that the named entity recognition model can focus on word "hypotensive" itself, and "increase" and "the" on the left of "hypotensive", because "increase" and "the" on the left of "hypotensive" are also in the entity text.

The seventh row element of the first matrix corresponds to the seventh word "effect" of the input sequence. The values of the fourth element, the fifth element, the sixth element and the seventh element in the seventh row of the first matrix are "1", which means that the named entity recognition model can focus on word "effect" itself, and "increase", "the" and "hypotensive" on the left of "effect", because "increase", "the" and "hypotensive" on the left of "effect" are also in the entity text.

The element in the eighth row of the first matrix corresponds to the eighth word "of" of the input sequence. The values of the elements in the eighth row of the first matrix are all 0, because the eighth word "of" is not within the entity text.

The complete first matrix is shown in FIG. 5.

After step 102, a corresponding first matrix may be generated for each target text.

In step 103, a named entity recognition model is generated using the first matrix. The named entity recognition model is obtained by training using first training data. The first training data includes word embeddings (word vectors) corresponding to one or more respective texts in a training text set, and the texts in the training text set are texts whose entity label has been labeled.

Figure 6:
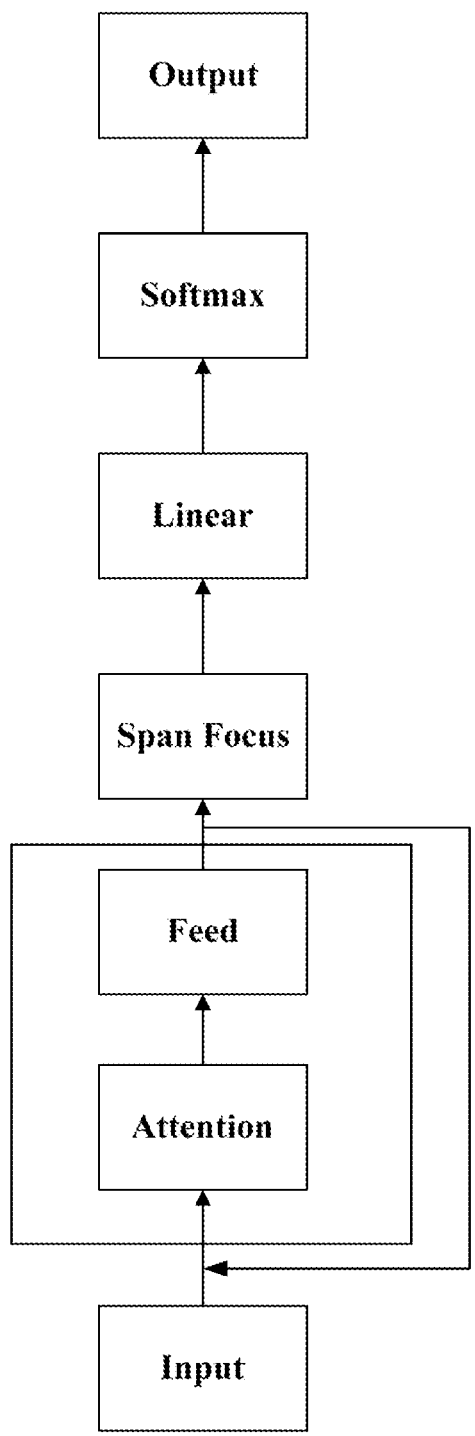
FIG. 6 is a schematic diagram illustrating the configuration of a named entity recognition model according to the embodiment of the present invention.

The configuration of the named entity recognition model is shown in FIG. 6, which includes the following layers.

1. Input layer. The input of the input layer is the output of step 101, that is, the result of the target text after preprocessing steps such as data format conversion, data noise removal, word segmentation and the like, and the output of the input layer is one or more corresponding embeddings.
2. Attention layer. The Attention layer is a self-attention layer, the output of the attention layer is shown in formula (1).

$$\text{Attention}(Q, K, V) = \text{softmax}\left(\frac{QK^T}{\sqrt{d_k}}\right) * V \quad (1)$$

In formula (1), "Q", and "V" are obtained using following formulas.

$$Q = W^Q * H \quad (2)$$

$$K = W^K * H \quad (3)$$

$$V = W^V * H \quad (4)$$

In the above formula, H is the input of the attention layer. Specifically, H may be a word embedding (word vector) converted from the word sequence obtained after performing the preprocessing steps such as the data format conversion, the data noise removal, and the word segmentation on the target text. $W^Q$, $W^K$ and $W^V$ are three trainable parameter matrices. Parameter $d_k$ is equal to the dimension of the embedding, $d_k$ may be set to 768, and may also be set to another value.

3. Feed forward layer. The feed forward layer is a feed forward neural network. The output of the feed forward layer is shown in formula (5).

$$s_i = \text{Relu}(z_i W_1 + b_1) W_2 + b_2 \quad (5)$$

In the above formula, $W_1$ and $W_2$ are a trainable parameter matrix whose size is the product of d and $d_f$, and a trainable parameter matrix whose size is the product of $d_f$ and d, respectively. "D" is the width of a hidden layer of the named entity recognition model, "df" is the width of a hidden layer of the feed forward neural network, $d_f$ may be set to 1536, and $d_f$ may also be set to another value. These two matrices W1 and W2 adjust parameters during training.

4. Span Focus layer. The input of the span focus layer is the output of the feed forward layer, and the output of span focus layer is shown in formula (6).

$$\text{Attention}(Q, K, V) = \text{softmax}\left(\frac{QK^T}{\sqrt{d_{k1}}}\right) * \text{Mask}_{span} * V \quad (6)$$

Here, $\text{Mask}_{span}$ is the first matrix mentioned above. The calculation methods of "Q", "K" and "V" are the same as formula (2), formula (3) and formula (4), namely, $Q=W^Q*H1$, $K=W^K*H1$, and $V=W^V*H1$, where H1 is the output of the feed forward neural network layer, $W^Q$, $W^K$ and $W^V$ are trainable parameter matrices, and parameter $d_{k1}$ is equal to the dimension of embedding, that is, $d_{k1}$ is the dimension of the H1 matrix. Parameter $d_{k1}$ may be set to 768, and may also be set to another value.

5. Linear layer. The linear layer is a mapping matrix from a representation dimension of the hidden layer of the named entity recognition model to a required dimension of the output layer. The dimension of the output of the span focus layer may be converted into a target dimension.

6. Softmax layer. The softmax layer may normalize an output result.

7. Output layer. The output layer may output probability distribution of the entity label corresponding to the target text.

For each input element (word), there is a target label corresponding to the element. Target label includes "B", "I" and "O", which respectively indicate a start element, a non-start element and a non-entity element of an entity text region. The entity text region is an entity name. By combining these labels, the position of the entity text in the input sequence can be distinguished.

In step 104, the target text is input to the named entity recognition model, and the probability distribution of the entity label corresponding to the target text is output.

Compared with the conventional technology, in the sequence labeling method for the entity text according to the embodiment of the present invention, a first matrix is generated based on the start position of the entity text within the target text, and the named entity recognition model is generated using the first matrix. The elements in the first matrix indicate the focusable weights of each word with respect to other words in the target text. In this way, position and range information of an entity can be introduced into the named entity recognition model, so that the named entity recognition model can learn and use the characteristics of the elements in the entity text. Accordingly, a right boundary of the entity can be determined accurately, and the recognition accuracy of the entity label can be improved.

The foregoing embodiment uses the named entity recognition as an example to illustrate the embodiment of the present invention. Note that the embodiment of the present invention is not limited to a task of named entity recognition, and may also be applied to another scenario.

Second Embodiment

Figure 7:
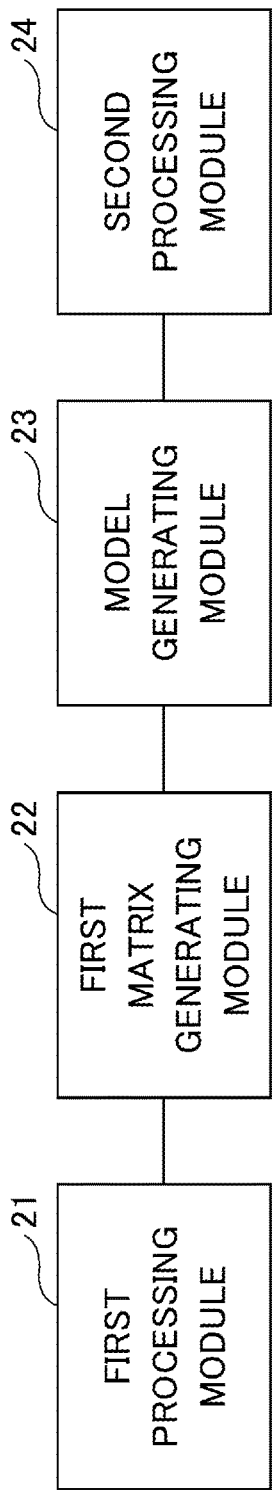
FIG. 7 is a block diagram illustrating a configuration of a sequence labeling apparatus for an entity text according to another embodiment of the present invention.

In another embodiment of the present invention, a sequence labeling apparatus for an entity text is further provided. FIG. 7 is a block diagram illustrating a configuration of the sequence labeling apparatus for the entity text according to the embodiment of the present invention. As shown in FIG. 7, the sequence labeling apparatus for the entity text includes a first processing module 21, a first matrix generating module 22, a model generating module 23, and a second processing module 24.

The first processing module 21 determines a start position of an entity text within a target text. The target text is a text having an entity label to be recognized.

Here, the target text may be a text input by a user, or a text obtained from the Internet. In a specific example, the target text may be "the potential to increase the hypotensive effect of".

Figure 8:
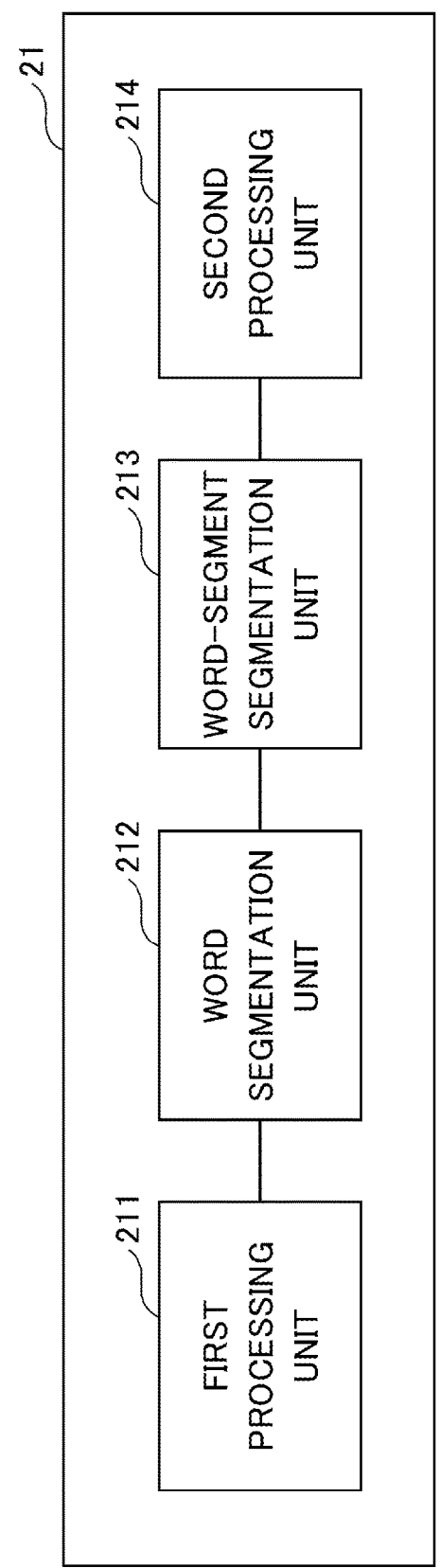
FIG. 8 is a schematic diagram illustrating the configuration of a first processing module according to the embodiment of the present invention.

As shown in FIG. 8, the first processing module 21 includes a first processing unit 211, word segmentation unit 212, a word-segment segmentation unit 213, and a second processing unit 214.

The first processing unit 211 preforms at least one of data format conversion and data noise removal is performed on the target text.

A data format of the target text may not meet the requirements. If the data format of the target text does not meet the requirements, the data format conversion of the target text may be performed to convert the original data format of the target text into a convenient format. Furthermore, the target text may include some data noise, such as a uniform resource locator (URL), an e-mail address, and a symbol such as "<" or ">"" introduced by a webpage. Such data noises may be removed, and xml tags such as "<html>", "<title>" and "<body>" introduced by a webpage may also be removed, so that only a text between the tags is kept to obtain the first text.

The word segmentation unit 212 segments words of the first text to obtain a first word sequence.

After at least one of the data format conversion and the data noise removal on the target text are performed to obtain the first text, the words of the first text may be segmented to divide a sentence in the first text into processable information units.

In some examples, an input first text sequence may be divided into word sequences using a python library NLTK. Note that a tool for segmenting the first text sequence is not limited to the above tool, and another tool for segmenting words may also be used.

The word-segment segmentation unit 213 segments word segments of the first word sequence to divide the first word sequence into a first word segment sequence.

Specifically, the word-segment segmentation unit 213 constructs a first initial model, and trains the first initial model using second training data to obtain a first segmentation model. The second training data includes a plurality of sets of data, and each set of the data includes a word sequence and a word segment sequence obtained by segmenting the word sequence. Then, the word-segment segmentation unit 213 segments the word segments of the first word sequence using the first segmentation model.

In some examples, the word sequence may be divided into the word segment sequence based on an open source tool subword-nmt. When training the first segmentation model, the model is trained using texts in the second training data, and a hyperparameter "s" in the first segmentation model may be set to 15000. Furthermore, when segmenting the word sequence using the trained first segmentation model, a hyperparameter "vocabulary-threshold" may be set to 50.

In a specific example, as shown in FIG. 3, the first text is the Japanese sentence "Shi Ryo Wa To Yama Ken Fu Gan Un Ga No Tei Shitsu O Mochi I Ta", the word sequence obtained by segmenting the first text is "ShiRyo/Wa/ToYama/Ken/FuGan/UnGa/No/TeiShitsu/O/Mochi I/Ta", and the word segment sequence obtained by segmenting the word segments of the word sequence is "ShiRyo", "Wa", "ToYama", "Ken", "FuGan", "UnGa", "No", "TeiShitsu", "O", "MochiI" and "Ta".

The second processing unit 214 inputs the first word segment sequence to a second training model to obtain the start position of the entity text.

Here, the second training model is a pre-trained model for recognizing the start position of the entity text, which can predict the start position of the entity text based on the input word segment sequence.

The apparatus further includes an obtaining module for obtaining the second training model. The obtaining module constructs a second initial model, and trains the second initial model using third training data to obtain the second training model. The third training data includes a plurality of word segment sequences whose start position of entity text has been labeled. Here, the language of the target text is associated with the language of the training data.

In a specific example, the word segment sequence that is input to the second training model is "the potential to increase the hypotensive effect of", the entity text thereof is "increase the hypotensive effect", and the start position of the entity text obtained using the second training model is "increase".

The first matrix generating module 22 generates a first matrix based on the start position of the entity text within the target text. The number of rows and the number of columns of the first matrix are equal to a sequence length of the target text. Elements in the first matrix indicate focusable weights of each word with respect to other words in the target text. The focusable weight of a word in the target text that is within the entity text with respect to a first word is greater than the focusable weight of the word with respect to a second word. The first word includes the word, and one or more words between the start position of the entity text and the word. The second word is a word other than the first word in the target text.

For each first word segment sequence, an initial matrix is generated. The number of rows and the number of columns of the initial matrix are equal to the length of the first word segment sequence, and values of all elements in the initial matrix are "0". For example, if the input sequence is "the potential to increase the hypotensive effect of", the initial matrix is shown in FIG. 4.

The values of the elements in the initial matrix are modified based on the start position of the entity text to obtain the first matrix. The elements in the first matrix indicate focusable weights whose value may be a non-zero value or zero. Here, the non-zero value may be "1" or may be set to another value as needed. If the value of the element is the non-zero value, it means that the corresponding position can be focused, and if the value of the element is zero, it means that the corresponding position cannot be focused. The value of the element in the i-th row of the first matrix indicates the focusable weight of the i-th word in an input sequence. The value of the element in the i-th row and the j-th column of the first matrix indicates the focusable weight of the i-th word with respect to the j-th word in the input sequence. Specifically, the values of the elements may be modified according to the following rules. For each word in the input sequence, if the word is within the scope of the entity text, the named entity recognition model may focus on the current word itself, and other words on the left of the current word within the scope of the entity text. The positions that cannot be focused retain the value of "0".

Specifically, the elements in the a-th row in the first matrix corresponds to the a-th word in the target text. If the a-th word and the k words on the left of the a-th word are within the scope of the entity text, values of the a-k-th element to the a-th element in the a-th row are set to the non-zero value, and values of other elements in the a-th row are set to zero, where a, i, j and k are positive integers.

In a specific example, the input sequence is "the potential to increase the hypotensive effect of", and the entity text thereof is "increase the hypotensive effect". Because the input sequence contains 8 words, the size of the first matrix is 8*8.

The element in the first row of the first matrix corresponds to the first word "the" of the input sequence. The values of the elements in the first row of the first matrix are all 0, because the first word "the" is not within the entity text.

The element in the second row of the first matrix corresponds to the second word "potential" of the input sequence. The values of the elements in the second row of the first matrix are all 0, because the second word "potential" is not within the entity text.

The element in the third row of the first matrix corresponds to the third word "to" of the input sequence. The values of the elements in the third row of the first matrix are all 0, because the third word "to" is not within the entity text.

The element in the fourth row of the first matrix corresponds to the fourth word "increase" of the input sequence, which is the first word of the entity text. Only the value of the fourth element in the fourth row of the first matrix is "1", and the values of other elements are 0", which means that the named entity recognition model can only focus on the information of "increase" itself, and there is no other word on the left of "increase" in the entity text.

The fifth row element of the first matrix corresponds to the fifth word "the" of the input sequence. The values of the fourth element and the fifth element in the fifth row of the first matrix are "1", which means that the named entity recognition model can focus on word "the" itself and "increase" on the left of "the", because "increase" on the left of "the" is also in the entity text.

The sixth row element of the first matrix corresponds to the sixth word "hypotensive" of the input sequence. The values of the fourth element, the fifth element and the sixth element in the sixth row of the first matrix are "1", which means that the named entity recognition model can focus on word "hypotensive" itself, and "increase" and "the" on the left of "hypotensive", because "increase" and "the" on the left of "hypotensive" are also in the entity text.

The seventh row element of the first matrix corresponds to the seventh word "effect" of the input sequence. The values of the fourth element, the fifth element, the sixth element and the seventh element in the seventh row of the first matrix are "1", which means that the named entity recognition model can focus on word "effect" itself, and "increase", "the" and "hypotensive" on the left of "effect", because "increase", "the" and "hypotensive" on the left of "effect" are also in the entity text.

The element in the eighth row of the first matrix corresponds to the eighth word "of" of the input sequence. The values of the elements in the eighth row of the first matrix are all 0, because the eighth word "of" is not within the entity text.

The complete first matrix is shown in FIG. 5.

A corresponding first matrix may be generated for each target text.

The model generating module generates a named entity recognition model using the first matrix. The named entity recognition model is obtained by training using first training data. The first training data includes word embeddings (word vectors) corresponding to one or more respective texts in a training text set, and the texts in the training text set are texts whose entity label has been labeled.

The configuration of the named entity recognition model is shown in FIG. 6, which includes the following layers.

1. Input layer. The input of the input layer is the output of step 101, that is, the result of the target text after preprocessing steps such as data format conversion, data noise removal, word segmentation and the like, and the output of the input layer is one or more corresponding embeddings.

2. Attention layer. The Attention layer is a self-attention layer, the output of the attention layer is shown in formula (1).

$$\text{Attention }(Q, K, V) = \text{softmax}\left(\frac{QK^T}{\sqrt{d_k}}\right) * V \quad (1)$$

In formula (1), "Q", and "V" are obtained using following formulas.

$$Q = W^Q * H \quad (2)$$

$$K = W^K * H \quad (3)$$

$$V = W^V * H \quad (4)$$

In the above formula, H is the input of the attention layer. Specifically, H may be a word embedding (word vector) converted from the word sequence obtained after performing the preprocessing steps such as the data format conversion, the data noise removal, and the word segmentation on the target text. $W^Q$, $W^K$ and $W^V$ are three trainable parameter matrices. Parameter $d_k$ is equal to the dimension of the embedding, $d_k$ may be set to 768, and may also be set to another value.

3. Feed forward layer. The feed forward layer is a feed forward neural network. The output of the feed forward layer is shown in formula (5).

$$s_t = \text{Re}lu(z_t W_1 + b_1)W_2 + b_2 \quad (5)$$

In the above formula, $W_1$ and $W_2$ are a trainable parameter matrix whose size is the product of d and $d_f$, and a trainable parameter matrix whose size is the product of $d_f$ and d, respectively. "D" is the width of a hidden layer of the named entity recognition model, "df" is the width of a hidden layer of the feed forward neural network, $d_f$ may be set to 1536, and $d_f$ may also be set to another value. These two matrices W1 and W2 adjust parameters during training.

4. Span Focus layer. The input of the span focus layer is the output of the feed forward layer, and the output of span focus layer is shown in formula (6).

$$\text{Attention }(Q, K, V) = \text{softmax}\left(\frac{QK^T}{\sqrt{d_{k1}}}\right) * Mask_{span} * V \quad (6)$$

Here, $Mask_{span}$ is the first matrix mentioned above. The calculation methods of "Q", "K" and "V" are the same as formula (2), formula (3) and formula (4), namely, Q=$W^Q$*H1, K=$W^K$*H1, and V=$W^V$*H1, where H1 is the output of the feed forward neural network layer, $W^Q$, $W^K$ and $W^V$ are trainable parameter matrices, and parameter $d_{k1}$ is equal to the dimension of embedding, that is, $d_{k1}$ is the dimension of the H1 matrix. Parameter $d_{k1}$ may be set to 768, and may also be set to another value.

5. Linear layer. The linear layer is a mapping matrix from a representation dimension of the hidden layer of the named entity recognition model to a required dimension of the output layer. The dimension of the output of the span focus layer may be converted into a target dimension.

6. Softmax layer. The softmax layer may normalize an output result.

7. Output layer. The output layer may output probability distribution of the entity label corresponding to the target text.

For each input element (word), there is a target label corresponding to the element. Target label includes "B", "I" and "O", which respectively indicate a start element, a non-start element and a non-entity element of an entity text region. The entity text region is an entity name. By combining these labels, the position of the entity text in the input sequence can be distinguished.

The second processing module 24 inputs the target text to the named entity recognition model, and outputs the probability distribution of the entity label corresponding to the target text.

In the sequence labeling apparatus for the entity text according to the embodiment of the present invention, a first matrix is generated based on the start position of the entity text within the target text, and the named entity recognition model is generated using the first matrix. The elements in the first matrix indicate the focusable weights of each word with respect to other words in the target text. In this way, position and range information of an entity can be introduced into the named entity recognition model, so that the named entity recognition model can learn and use the characteristics of the elements in the entity text. Accordingly, a right boundary of the entity can be determined accurately, and the recognition accuracy of the entity label can be improved.

Third Embodiment

Figure 9:
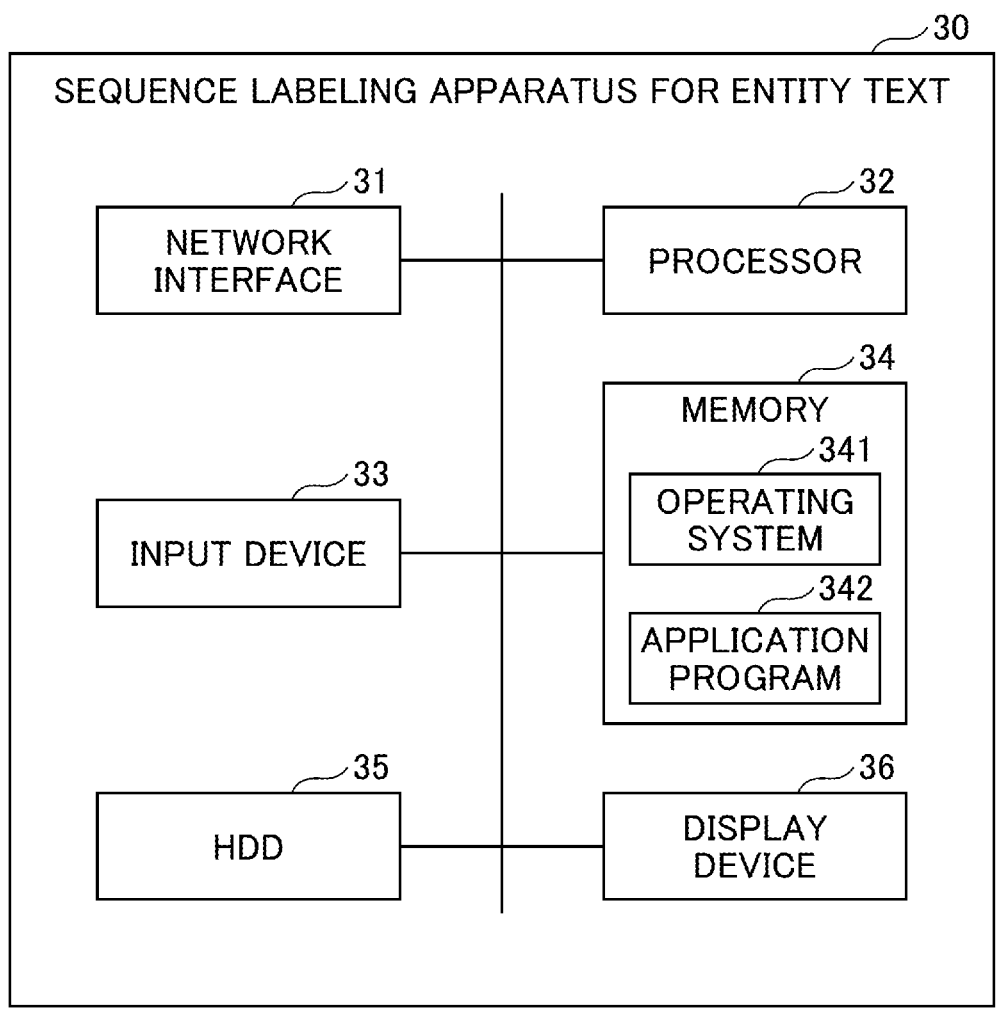
FIG. 9 is a block diagram illustrating the configuration of a sequence labeling apparatus for an entity text according to another embodiment of the present invention.

In another embodiment of the present invention, a sequence labeling apparatus 30 of an entity text is further provided. FIG. 9 is a block diagram illustrating a configuration of the sequence labeling apparatus 30 of the entity text according to the embodiment of the present invention. As shown in FIG. 9, the sequence labeling apparatus 30 of the entity text includes a processor 32, and a memory 34 storing computer-executable instructions.

When the computer-executable instructions are executed by the processor 32, the processor 32 determines a start position of an entity text within a target text. The target text is a text having an entity label to be recognized.

Then, the processor 32 generates a first matrix based on the start position of the entity text within the target text. The number of rows and the number of columns of the first matrix are equal to a sequence length of the target text, and elements in the first matrix indicate focusable weights of each word with respect to other words in the target text. The focusable weight of a word in the target text that is within the entity text with respect to a first word is greater than the focusable weight of the word with respect to a second word. The first word includes the word, and one or more words between the start position of the entity text and the word. The second word is a word other than the first word in the target text.

Then, the processor 32 generates a named entity recognition model using the first matrix. The named entity recognition model is obtained by training using first training data, the first training data includes word embeddings corresponding to one or more respective texts in a training text set, and the texts in the training text set are texts whose entity label has been labeled.

Then, the processor 32 inputs the target text to the named entity recognition model, and outputs probability distribution of the entity label corresponding to the target text.

Furthermore, as illustrated in FIG. 9, the sequence labeling apparatus 30 further includes a network interface 31, an input device 33, a hard disk drive (HDD) 35, and a display device 36.

Each of the ports and each of the devices may be connected to each other via a bus architecture. The processor 32, such as one or more central processing units (CPUs), and the memory 34, such as one or more memory units, may be connected via various circuits. Other circuits such as an external device, a regulator, and a power management circuit may also be connected via the bus architecture. Note that these devices are communicably connected via the bus architecture. The bus architecture includes a power supply bus, a control bus and a status signal bus besides a data bus. The detailed description of the bus architecture is omitted here.

The network interface 31 may be connected to a network (such as the Internet, a LAN or the like), receive data such as the target text from the network, and store the received data in the hard disk drive 35.

The input device 33 may receive various commands input by a user, and transmit the commands to the processor 32 to be executed. The input device 33 may include a keyboard, pointing devices (such as a mouse or a track ball), a touch board, a touch panel or the like.

The display device 36 may display a result obtained by executing the commands.

The memory 34 stores programs and data required for running an operating system, and data such as intermediate results in calculation processes of the processor 32.

Note that the memory 34 of the embodiments of the present invention may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which may be used as an external high-speed buffer. The memory 34 of the apparatus or the method is not limited to the described types of memory, and may include any other suitable memory.

In some examples, the memory 34 stores executable modules or data structure, their subsets, or their superset, i.e., an operating system (OS) 341 and an application program 342.

The operating system 341 includes various system programs for implementing various essential tasks and processing tasks based on hardware, such as a frame layer, a core library layer, a drive layer and the like. The application program 342 includes various application programs for implementing various application tasks, such as a browser and the like. A program for realizing the method according to the embodiments of the present invention may be included in the application program 342.

When calling and executing application programs and data stored in the memory 34, specifically, programs or instructions stored in the application program 342, the processor 32 determines a start position of an entity text within a target text. The target text is a text having an entity label to be recognized. Then, the processor 32 generates a first matrix based on the start position of the entity text within the target text. The number of rows and the number of columns of the first matrix are equal to a sequence length of the target text, elements in the first matrix indicate focusable weights of each word with respect to other words in the target text, the focusable weight of a word in the target text that is within the entity text with respect to a first word is greater than the focusable weight of the word with respect to a second word, the first word includes the word, and one or more words between the start position of the entity text and the word, and the second word is a word other than the first word in the target text. Then, the processor generates a named entity recognition model using the first matrix. The named entity recognition model is obtained by training using first training data, the first training data includes word embeddings corresponding to one or more respective texts in a training text set, and the texts in the training text set are texts whose entity label has been labeled. Then, the processor 32 inputs the target text to the named entity recognition model, and outputs probability distribution of the entity label corresponding to the target text.

Furthermore, when calling and executing application programs and data stored in the memory 34, specifically, programs or instructions stored in the application program 342, the processor 32 performs at least one of data format conversion and data noise removal on the target text to obtain a first text, segments words of the first text to obtain a first word sequence, segments word segments of the first word sequence to divide the first word sequence into a first word segment sequence, and inputs the first word segment sequence to a second training model to obtain the start position of the entity text.

Furthermore, when calling and executing application programs and data stored in the memory 34, specifically, programs or instructions stored in the application program 342, the processor 32 constructs a first initial model, and trains the first initial model using second training data to obtain a first segmentation model. The second training data includes a plurality of sets of data, and each set of the data includes a word sequence and a word segment sequence obtained by segmenting the word sequence. Then, the processor 32 segments the word segments of the first word sequence using the first segmentation model.

Furthermore, when calling and executing application programs and data stored in the memory 34, specifically, programs or instructions stored in the application program 342, the processor 32 constructs a second initial model, and trains the second initial model using third training data to obtain the second training model. The third training data includes a plurality of word segment sequences whose start position of entity text has been labeled.

Furthermore, the element in the i-th row and the the j-th column in the first matrix indicates the focusable weight of the i-th word with respect to the j-th word in the target text. The elements in the a-th row in the first matrix corresponds to the a-th word in the target text. When calling and executing application programs and data stored in the memory 34, specifically, programs or instructions stored in the application program 342, the processor 32 sets values of the a-k-th element to the a-th element in the a-th row to a non-zero value, and sets values of other elements in the a-th row to zero, if the a-th word and the k words on the left of the a-th word are within the entity text, where a, i, j and k are positive integers.

Furthermore, the named entity recognition model is a self-attention model, and the named entity recognition model includes an attention layer, a feed forward neural network layer, and a span focus layer, a linear layer, and a softmax layer. Input of the attention layer is word embeddings corresponding to the target text, and output of the attention layer is input of the feed forward neural network layer. Output of the feed forward neural network layer is input of the span focus layer, and output of the span focus layer is $$\text{Attention}(Q, K, V) = \text{softmax}\left(\frac{QK^T}{\sqrt{d_{k1}}}\right) * Mask_{span} * V$$

where $Q=W^Q*H1$, $K=W^K*H1$, $V=W^V*H1$, H1 is the output of the feed forward neural network layer, $W^Q$, $W^K$ and $W^V$ are trainable parameter matrices, $Mask_{span}$ is the first matrix, and $d_{k1}$ is a dimension of an H1 matrix. The linear layer converts a dimension of the output of the span focus layer. The softmax layer normalizes an output result.

In the sequence labeling apparatus for the entity text according to the embodiment of the present invention, a first matrix is generated based on the start position of the entity text within the target text, and the named entity recognition model is generated using the first matrix. The elements in the first matrix indicate the focusable weights of each word with respect to other words in the target text. In this way, position and range information of an entity can be introduced into the named entity recognition model, so that the named entity recognition model can learn and use the characteristics of the elements in the entity text. Accordingly, a right boundary of the entity can be determined accurately, and the recognition accuracy of the entity label can be improved.

The method according to the above embodiments of the present invention may be applied to the processor 32 or may be implemented by the processor 32. The processor 32 may be an integrated circuit chip capable of processing signals. Each step of the above method may be implemented by instructions in a form of integrated logic circuit of hardware in the processor 32 or a form of software. The processor 32 may be a general-purpose processor, a digital signal processor (DSP), an application specific integrated circuit (ASIC), field programmable gate array signals (FPGA) or other programmable logic device (PLD), a discrete gate or transistor logic, discrete hardware components capable of realizing or executing the methods, the steps and the logic blocks of the embodiments of the present invention. The general-purpose processor may be a micro-processor, or alternatively, the processor may be any common processor. The steps of the method according to the embodiments of the present invention may be realized by a hardware decoding processor, or combination of hardware modules and software modules in a decoding processor. The software modules may be located in a conventional storage medium such as a random access memory (RAM), a flash memory, a read-only memory (ROM), a erasable programmable read-only memory (EPROM), an electrically erasable programmable read-only memory (EEPROM), a register or the like. The storage medium is located in the memory 34, and the processor 32 reads information in the memory 34 and realizes the steps of the above methods in combination with hardware.

Note that the embodiments described herein may be realized by hardware, software, firmware, intermediate code, microcode or any combination thereof. For hardware implementation, the processor may be realized in one or more application specific integrated circuits (ASIC), digital signal processing devices (DSPD), programmable logic devices (PLD), field programmable gate array signals (FPGA), general-purpose processors, controllers, microcontrollers, micro-processors, or other electronic components or their combinations for realizing functions of the present invention.

For software implementation, the embodiments of the present invention may be realized by executing functional modules (such as processes, functions or the like). Software codes may be stored in a memory and executed by a processor. The memory may be implemented inside or outside the processor.

Fourth Embodiment

In another embodiment of the present invention, a non-transitory computer-readable recording medium having computer-executable instructions for execution by one or more processors is further provided. The execution of the computer-executable instructions cause the one or more processors to carry out a sequence labeling method for an entity text. The method includes determining a start position of an entity text within a target text. The target text is a text having an entity label to be recognized. The method further includes generating a first matrix based on the start position of the entity text within the target text. The number of rows and the number of columns of the first matrix are equal to a sequence length of the target text, elements in the first matrix indicate focusable weights of each word with respect to other words in the target text, the focusable weight of a word in the target text that is within the entity text with respect to a first word is greater than the focusable weight of the word with respect to a second word, the first word includes the word, and one or more words between the start position of the entity text and the word, and the second word is a word other than the first word in the target text. The method further includes generating a named entity recognition model using the first matrix. The named entity recognition model is obtained by training using first training data, the first training data includes word embeddings corresponding to one or more respective texts in a training text set, and the texts in the training text set are texts whose entity label has been labeled. The method further includes inputting the target text to the named entity recognition model, and outputting probability distribution of the entity label corresponding to the target text.

Furthermore, the sequence labeling method includes performing at least one of data format conversion and data noise removal on the target text to obtain a first text; segmenting words of the first text to obtain a first word sequence; segmenting word segments of the first word sequence to divide the first word sequence into a first word segment sequence; and inputting the first word segment sequence to a second training model to obtain the start position of the entity text.

Furthermore, the sequence labeling method includes constructing a first initial model, and training the first initial model using second training data to obtain a first segmentation model. The second training data includes a plurality of sets of data, and each set of the data includes a word sequence and a word segment sequence obtained by segmenting the word sequence. The method segments the word segments of the first word sequence using the first segmentation model.

Furthermore, the sequence labeling method includes constructing a second initial model, and training the second initial model using third training data to obtain the second training model. The third training data includes a plurality of word segment sequences whose start position of entity text has been labeled.

Furthermore, the element in the i-th row and the j-th column in the first matrix indicates the focusable weight of the i-th word with respect to the j-th word in the target text. The elements in the a-th row in the first matrix corresponds to the a-th word in the target text. If the a-th word and the k words on the left of the a-th word are within the entity text, values of the a-k-th element to the a-th element in the a-th row are set to a non-zero value, and values of other elements in the a-th row are set to zero, where a, i, j and k are positive integers.

Furthermore, the named entity recognition model is a self-attention model, and the named entity recognition model includes an attention layer, a feed forward neural network layer, and a span focus layer, a linear layer, and a softmax layer. Input of the attention layer is word embeddings corresponding to the target text, and output of the attention layer is input of the feed forward neural network layer. Output of the feed forward neural network layer is input of the span focus layer, and output of the span focus layer is $$\text{Attention}(Q, K, V) = \text{softmax}\left(\frac{QK^T}{\sqrt{d_{k1}}}\right) * Mask_{span} * V$$

where $Q=W^Q*H1$, $K=W^K*H1$, $V=W^V*H1$, H1 is the output of the feed forward neural network layer, $W^Q$, $W^K$ and $W^V$ are trainable parameter matrices, $Mask_{span}$ is the first matrix, and $d_{k1}$ is a dimension of an H1 matrix. The linear layer converts a dimension of the output of the span focus layer. The softmax layer normalizes an output result.

The present invention is not limited to the specifically described embodiments, and various modifications, combinations and replacements may be made without departing from the scope of the present invention.

What is claimed is:

1. A method for sequence labeling on an entity text, the method comprising:
   determining a start position of an entity text within a target text, the target text being a text having an entity label to be recognized;
   generating a first matrix based on the start position of the entity text within the target text, the number of rows and the number of columns of the first matrix being equal to a sequence length of the target text, elements in the first matrix indicating focusable weights of each word with respect to other words in the target text, the focusable weight of a word in the target text that is within the entity text with respect to a first word being greater than the focusable weight of the word with respect to a second word, the first word including the word, and one or more words between the start position of the entity text and the word, and the second word being a word other than the first word in the target text;
   generating a named entity recognition model using the first matrix, the named entity recognition model being obtained by training using first training data, the first training data including word embeddings corresponding to one or more respective texts in a training text set, and the texts in the training text set being texts whose entity label has been labeled; and
   inputting the target text to the named entity recognition model, and outputting probability distribution of the entity label corresponding to the target text,
   wherein determining the start position of the entity text within the target text includes performing at least one of data format conversion and data noise removal on the target text to obtain a first text;

segmenting words of the first text to obtain a first word sequence;

segmenting word segments of the first word sequence to divide the first word sequence into a first word segment sequence; and inputting the first word segment sequence to a second training model to obtain the start position of the entity text.

2. The method for sequence labeling on an entity text as claimed in claim 1, wherein segmenting the word segments of the first word sequence includes constructing a first initial model, and training the first initial model using second training data to obtain a first segmentation model, the second training data including a plurality of sets of data, and each set of the data including a word sequence and a word segment sequence obtained by segmenting the word sequence; and segmenting the word segments of the first word sequence using the first segmentation model.

3. The method for sequence labeling on an entity text as claimed in claim 1, the method further comprising:

obtaining the second training model, wherein obtaining the second training model includes constructing a second initial model, and training the second initial model using third training data to obtain the second training model, the third training data including a plurality of word segment sequences whose start position of entity text has been labeled.

4. The method for sequence labeling on an entity text as claimed in claim 1, wherein the element in the i-th row and the j-th column in the first matrix indicates the focusable weight of the i-th word with respect to the j-th word in the target text, and wherein the elements in the a-th row in the first matrix corresponds to the a-th word in the target text, and if the a-th word and the k words on the left of the a-th word are within the entity text, values of the a-k-th element to the a-th element in the a-th row are set to a non-zero value, and values of other elements in the a-th row are set to zero, where a, i, j and k are positive integers.

5. The method for sequence labeling on an entity text as claimed in claim 1, wherein the named entity recognition model is a self-attention model, and the named entity recognition model includes an attention layer, a feed forward neural network layer, and a span focus layer, a linear layer, and a softmax layer, wherein input of the attention layer is word embeddings corresponding to the target text, and output of the attention layer is input of the feed forward neural network layer, wherein output of the feed forward neural network layer is input of the span focus layer, and output of the span focus layer is $$\text{Attention}(Q, K, V) = \text{softmax}\left(\frac{QK^T}{\sqrt{d_{k1}}}\right) * Mask_{span} * V$$

where $Q=W^Q*H1$, $K=W^K*H1$, $V=W^V*H1$, H1 is the output of the feed forward neural network layer, $W^Q$, $W^K$ and $W^V$ are trainable parameter matrices, $Mask_{span}$ is the first matrix, and $d_{ki}$ is a dimension of an H1 matrix, wherein the linear layer converts a dimension of the output of the span focus layer, and wherein the softmax layer normalizes an output result.

6. An apparatus for sequence labeling on an entity text, the apparatus comprising:

a memory storing computer-executable instructions; and one or more processors configured to execute the computer-executable instructions such that the one or more processors are configured to determine a start position of an entity text within a target text, the target text being a text having an entity label to be recognized;

generate a first matrix based on the start position of the entity text within the target text, the number of rows and the number of columns of the first matrix being equal to a sequence length of the target text, elements in the first matrix indicating focusable weights of each word with respect to other words in the target text, the focusable weight of a word in the target text that is within the entity text with respect to a first word being greater than the focusable weight of the word with respect to a second word, the first word including the word, and one or more words between the start position of the entity text and the word, and the second word being a word other than the first word in the target text;

generate a named entity recognition model using the first matrix, the named entity recognition model being obtained by training using first training data, the first training data including word embeddings corresponding to one or more respective texts in a training text set, and the texts in the training text set being texts whose entity label has been labeled; and input the target text to the named entity recognition model, and output probability distribution of the entity label corresponding to the target text, wherein determining the start position of the entity text within the target text includes performing at least one of data format conversion and data noise removal on the target text to obtain a first text;

segmenting words of the first text to obtain a first word sequence;

segmenting word segments of the first word sequence to divide the first word sequence into a first word segment sequence; and inputting the first word segment sequence to a second training model to obtain the start position of the entity text.

7. The apparatus for sequence labeling on an entity text as claimed in claim 6, wherein the one or more processors are configured to construct a first initial model, and train the first initial model using second training data to obtain a first segmentation model, the second training data including a plurality of sets of data, and each set of the data including a word sequence and a word segment sequence obtained by segmenting the word sequence; and segment the word segments of the first word sequence using the first segmentation model.

8. The apparatus for sequence labeling on an entity text as claimed in claim 6, wherein the one or more processors are configured to obtain the second training model, and wherein the one or more processors are configured to construct a second initial model, and train the second initial model using third training data to obtain the second training model, the third training data including a plurality of word segment sequences whose start position of entity text has been labeled.

9. The apparatus for sequence labeling on an entity text as claimed in claim 6,
wherein the element in the i-th row and the j-th column in the first matrix indicates the focusable weight of the i-th word with respect to the j-th word in the target text, and
wherein the elements in the a-th row in the first matrix corresponds to the a-th word in the target text, and if the a-th word and the k words on the left of the a-th word are within the entity text, values of the a-k-th element to the a-th element in the a-th row are set to a non-zero value, and values of other elements in the a-th row are set to zero, where a, i, j and k are positive integers.

10. The apparatus for sequence labeling on an entity text as claimed in claim 6,
wherein the named entity recognition model is a self-attention model, and the named entity recognition model includes an attention layer, a feed forward neural network layer, and a span focus layer, a linear layer, and a softmax layer,
wherein input of the attention layer is word embeddings corresponding to the target text, and output of the attention layer is input of the feed forward neural network layer,
wherein output of the feed forward neural network layer is input of the span focus layer, and output of the span focus layer is $$\text{Attention}(Q, K, V) = \text{softmax}\left(\frac{QK^T}{\sqrt{d_{k1}}}\right) * Mask_{span} * V,$$

where $Q=W^Q*H1$, $K=W^K*H1$, $V=W^V*H1$, H1 is the output of the feed forward neural network layer, $W^Q$, $W^K$ and $W^V$ are trainable parameter matrices, $Mask_{span}$ is the first matrix, and $d_{k1}$ is a dimension of an H1 matrix,
wherein the linear layer converts a dimension of the output of the span focus layer, and
wherein the softmax layer normalizes an output result.

11. A non-transitory computer-readable recording medium having computer-executable instructions for execution by one or more processors, wherein, the computer-executable instructions, when executed, cause the one or more processors to carry out a method for sequence labeling on an entity text, the method comprising:
determining a start position of an entity text within a target text, the target text being a text having an entity label to be recognized;
generating a first matrix based on the start position of the entity text within the target text, the number of rows and the number of columns of the first matrix being equal to a sequence length of the target text, elements in the first matrix indicating focusable weights of each word with respect to other words in the target text, the focusable weight of a word in the target text that is within the entity text with respect to a first word being greater than the focusable weight of the word with respect to a second word, the first word including the word, and one or more words between the start position of the entity text and the word, and the second word being a word other than the first word in the target text;
generating a named entity recognition model using the first matrix, the named entity recognition model being obtained by training using first training data, the first training data including word embeddings corresponding to one or more respective texts in a training text set, and the texts in the training text set being texts whose entity label has been labeled; and
inputting the target text to the named entity recognition model, and outputting probability distribution of the entity label corresponding to the target text,
wherein determining the start position of the entity text within the target text includes
performing at least one of data format conversion and data noise removal on the target text to obtain a first text;
segmenting words of the first text to obtain a first word sequence;
segmenting word segments of the first word sequence to divide the first word sequence into a first word segment sequence; and
inputting the first word segment sequence to a second training model to obtain the start position of the entity text.

12. The non-transitory computer-readable recording medium as claimed in claim 11,
wherein segmenting the word segments of the first word sequence includes
constructing a first initial model, and training the first initial model using second training data to obtain a first segmentation model, the second training data including a plurality of sets of data, and each set of the data including a word sequence and a word segment sequence obtained by segmenting the word sequence; and
segmenting the word segments of the first word sequence using the first segmentation model.

13. The non-transitory computer-readable recording medium as claimed in claim 11,
wherein the method further includes obtaining the second training model, and
wherein obtaining the second training model includes
constructing a second initial model, and training the second initial model using third training data to obtain the second training model, the third training data including a plurality of word segment sequences whose start position of entity text has been labeled.

14. The non-transitory computer-readable recording medium as claimed in claim 11,
wherein the element in the i-th row and the j-th column in the first matrix indicates the focusable weight of the i-th word with respect to the j-th word in the target text, and
wherein the elements in the a-th row in the first matrix corresponds to the a-th word in the target text, and if the a-th word and the k words on the left of the a-th word are within the entity text, values of the a-k-th element to the a-th element in the a-th row are set to a non-zero value, and values of other elements in the a-th row are set to zero, where a, i, j and k are positive integers.

15. The non-transitory computer-readable recording medium as claimed in claim 11,
wherein the named entity recognition model is a self-attention model, and the named entity recognition model includes an attention layer, a feed forward neural network layer, and a span focus layer, a linear layer, and a softmax layer, wherein input of the attention layer is word embeddings corresponding to the target text, and output of the attention layer is input of the feed forward neural network layer, wherein output of the feed forward neural network layer is input of the span focus layer, and output of the span focus layer is $$\text{Attention}(Q, K, V) = \text{softmax}\left(\frac{QK^T}{\sqrt{d_{k1}}}\right) * Mask_{span} * V,$$

where $Q=W^Q*H1$, $K=W^K*H1$, $V=W^V*H1$, H1 is the output of the feed forward neural network layer, $W^Q$, $W^K$ and $W^V$ are trainable parameter matrices, $Mask_{span}$ is the first matrix, and $d_{k1}$ is a dimension of an H1 matrix, wherein the linear layer converts a dimension of the output of the span focus layer, and wherein the softmax layer normalizes an output result.

* * * * *